US008366032B2

(12) United States Patent
Yeh et al.

(10) Patent No.: US 8,366,032 B2
(45) Date of Patent: Feb. 5, 2013

(54) FISHING REEL

(76) Inventors: Shih-Yuan Yeh, Taichung (TW); Simon Bradbury, Stockport (GB)

( * ) Notice: Subject to any disclaimer, the term of this patent is extended or adjusted under 35 U.S.C. 154(b) by 166 days.

(21) Appl. No.: 13/049,060

(22) Filed: Mar. 16, 2011

(65) Prior Publication Data

US 2012/0234955 A1 Sep. 20, 2012

(51) Int. Cl.
*A01K 89/01* (2006.01)

(52) U.S. Cl. .................................................... 242/288

(58) Field of Classification Search .................. 242/288
See application file for complete search history.

(56) References Cited

U.S. PATENT DOCUMENTS 4,790,492 A * 12/1988 Atobe .......................... 242/223
5,692,693 A * 12/1997 Yamaguchi .................. 242/288
6,086,005 A * 7/2000 Kobayashi et al. ........... 242/288
6,150,745 A * 11/2000 Carpenter .................... 310/90.5
6,412,722 B1 * 7/2002 Kreuser et al. ................ 242/288
6,964,387 B2 * 11/2005 Hyun ........................... 242/288

* cited by examiner

*Primary Examiner* — Emmanuel M Marcelo
(74) *Attorney, Agent, or Firm* — Ming Chow; Sinorica, LLC

(57) ABSTRACT

The fishing reel has a body and a deceleration controller. The body has a magnetic spool and a side cover. The deceleration controller is mounted on the side cover and has a mounting tube, a moving shaft, a magnetic assembly and a switching button. The mounting tube is mounted through the side cover and has an inner thread. The moving shaft is movably mounted through the mounting tube and has an inside end, an outside end, an outer surface and a thread section. The thread section is formed in the outer surface of the moving shaft and screwed with the inner thread of the mounting tube. The magnetic assembly is securely mounted on the inside end of the moving shaft. The switching button is mounted securely on the outside end of the moving shaft to turn the moving shaft moveable inwardly or outwardly relative to the magnetic spool.

16 Claims, 5 Drawing Sheets

FISHING REEL

BACKGROUND OF THE INVENTION

1. Field of the Invention

The present invention relates to a fishing reel, and more particularly to a fishing reel with a magnetically deceleration controller to decrease the rotation speed of a spool.

2. Description of Related Art

A convention fishing reel has a body, a spool, a handle, a clutch and a switch. The body is a cylindrical frame and has a middle section. The spool is rotatably mounted in the middle section of the body to wind fishing line on the spool. The handle is rotatably mounted on an end of the body and selectively connects to and rotates the spool. The clutch is mounted between the spool and the handle and selectively connects the spool and the handle by the switch.

In use, when the switch is turned to make the clutch disengaging the handle from the spool, the spool may rotate freely and is used in throwing bait and releasing fishing line quickly. When the switch is turned to make the clutch connecting the handle with the spool, the handle and the spool are connected and rotating synchronously with each other and may be used in winding fishing line on the spool.

In throwing bait, the spool is adjusted to rotate freely and release the fishing line quickly in order to throw the bait far or deeply. When the bait is dropped into the water or fell on the ground of sea, lake or river, a pulling force from the thrown bait is reduced immediately. However, the spool still keeps rotating quickly and too much fishing line is released and easily entwined and tied on the spool.

In order to resolve the aforementioned problem, the user always decelerates or stops the spool by touching the rotating spool with hands. However, decelerating the rotating spool with hands is unsafety and not easy to control the spin of the spool finely.

To overcome the shortcomings, the present invention tends to provide a fishing reel with a magnetically deceleration controller to mitigate or obviate the aforementioned problems.

SUMMARY OF THE INVENTION

The main objective of the present invention is to provide a fishing reel with a magnetic deceleration controller to decrease the rotation speed of a spool.

The fishing reel has a body and a deceleration controller. The body has a magnetic spool and a side cover. The side cover is mounted on one end of the body. The deceleration controller is mounted on the side cover and has a mounting tube, a moving shaft, a magnetic assembly and a switching button. The mounting tube is mounted through the side cover and has an inner thread. The moving shaft is movably mounted through the mounting tube and has an inside end, an outside end, an outer surface and a thread section. The thread section is formed in the outer surface of the moving shaft and screwed with the inner thread of the mounting tube. The magnetic assembly is mounted securely on the inside end of the moving shaft. The switching button is mounted securely on the outside end of the moving shaft to turn the moving shaft rotating relative to the mounting tube and moveable inwardly or outwardly relative to the magnetic spool.

Other objects, advantages and novel features of the invention will become more apparent from the following detailed description when taken in junction with the accompanying drawings.

DETAILED DESCRIPTION OF PREFERRED EMBODIMENT

Figure 1:
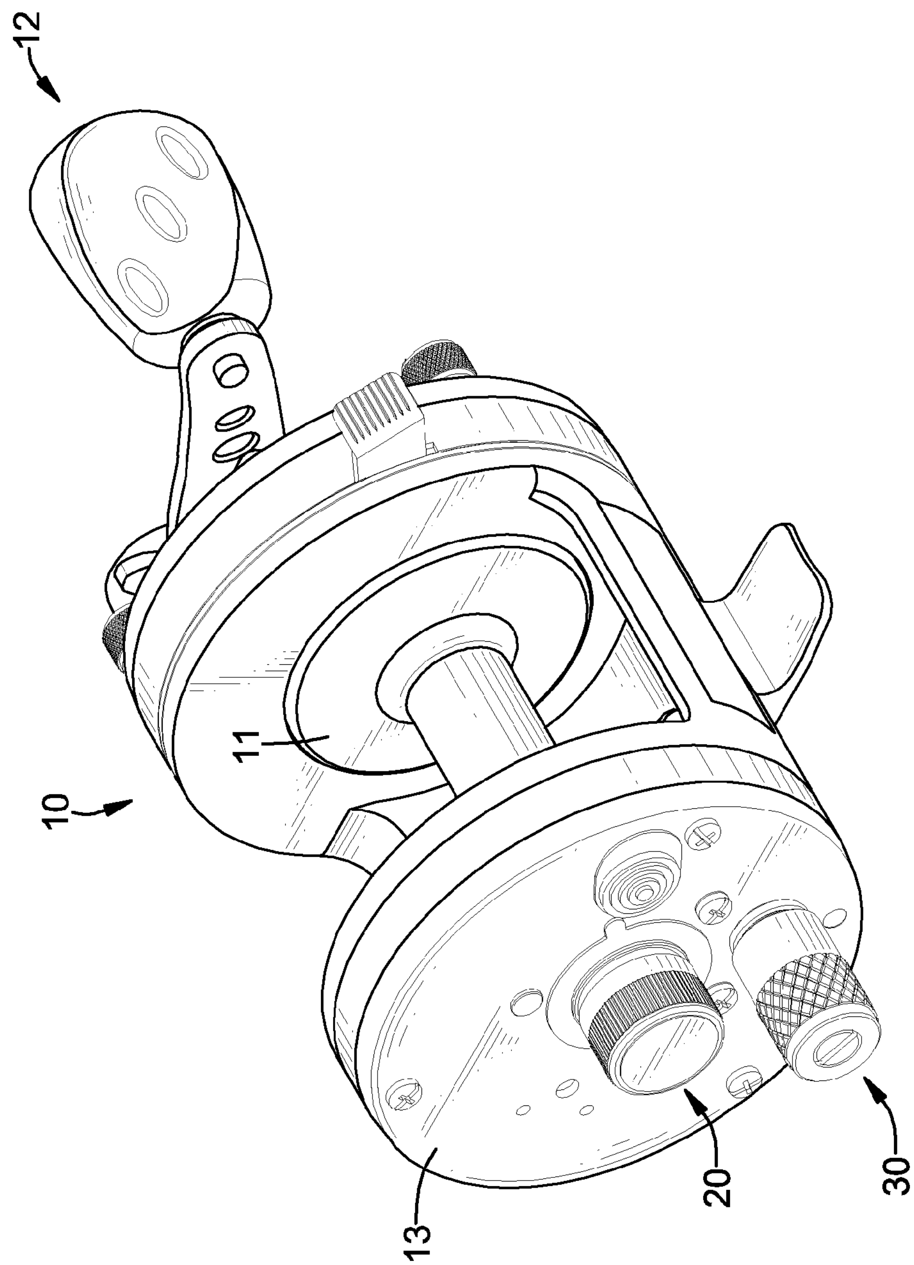
FIG. 1 is a perspective view of a fishing reel in accordance with the present invention.
Figure 2:
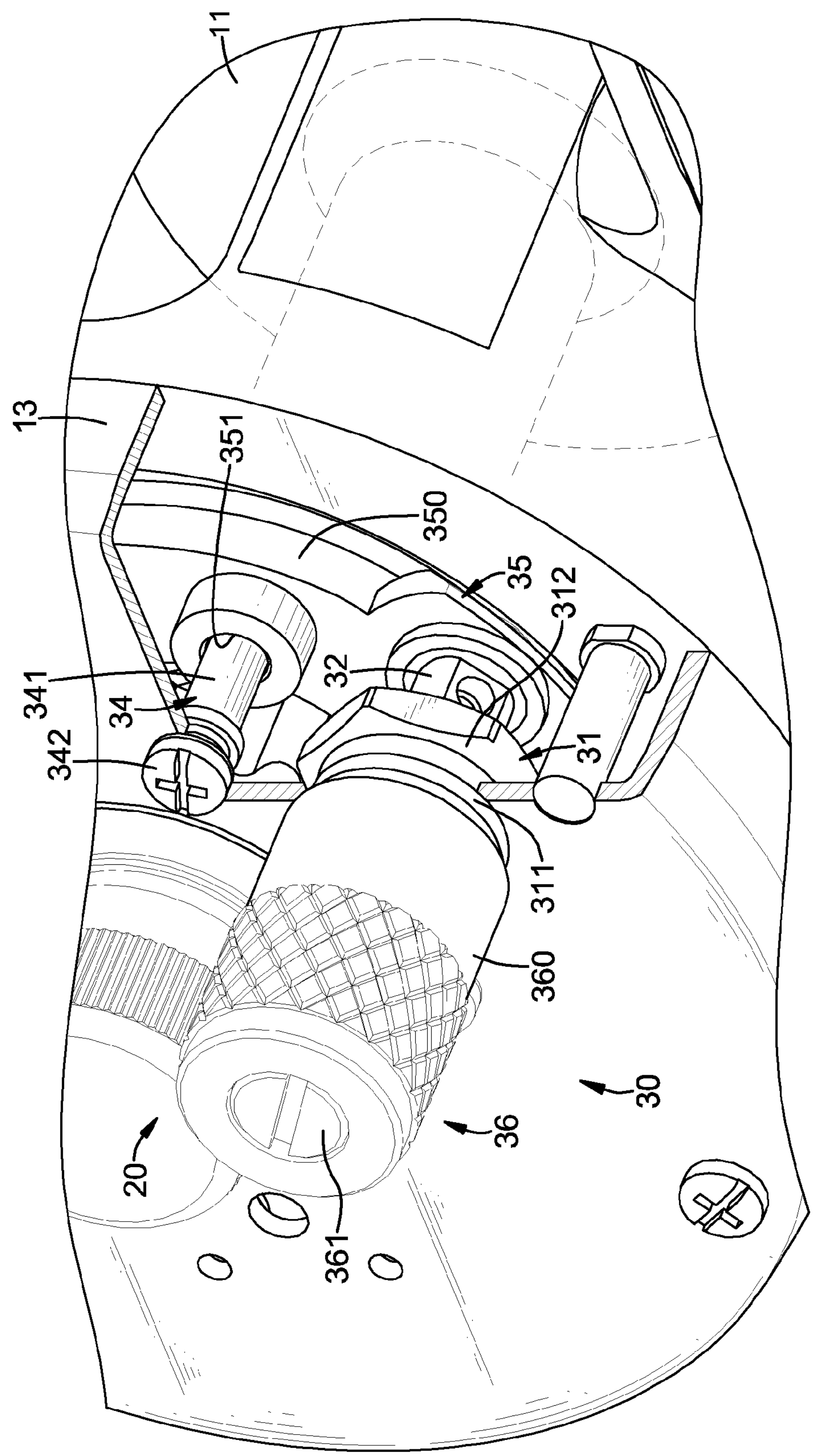
FIG. 2 is an enlarged perspective view in partial section of the fishing reel in FIG. 1.

With reference to FIGS. 1 and 2, a fishing reel in accordance with the present invention has a body 10, a rotation controller 20 and a deceleration controller 30.

The body 10 is a hollow cylinder frame and has a middle section, a proximal end, a distal end, a magnetic spool 11, a handle 12, a clutch, a switch and a side cover 13. The magnetic spool 11 is rotatably mounted on the middle section of the body 10 for winding fishing line thereon. The magnetic spool 11 may be made of magnetic material which contains iron or nickel. The magnetic spool 11 also may be attached with a magnetic metal.

The handle 12 is rotatably mounted on the distal end of the body 10 and selectively connects to the magnetic spool 11 to drive the magnetic spool 11 rotating relative to the body 10. The clutch is mounted between the magnetic spool 11 and the handle 12 and selectively connects the magnetic spool 11 and the handle 12 by the switch. The side cover 13 is mounted on the proximal end of the body 10 and has an inner side and an outer side. The inner side of the side cover 13 faces the magnetic spool 11. The outer side of the side cover 13 is opposite to the magnetic spool 11.

The rotation controller 20 is mounted on the side cover 13 and selectively presses on the magnetic spool 11 to control the rotation speed of the magnetic spool 11 by a button. When the button is turned to press the rotation controller 20 onto the magnetic spool 11, the magnetic spool 11 is decelerated or stopped by a friction force between the rotation controller 20 and the magnetic spool 11. The rotation controller 20 is used in a wide adjustment of the rotation speed of the magnetic spool 11.

Figure 3:
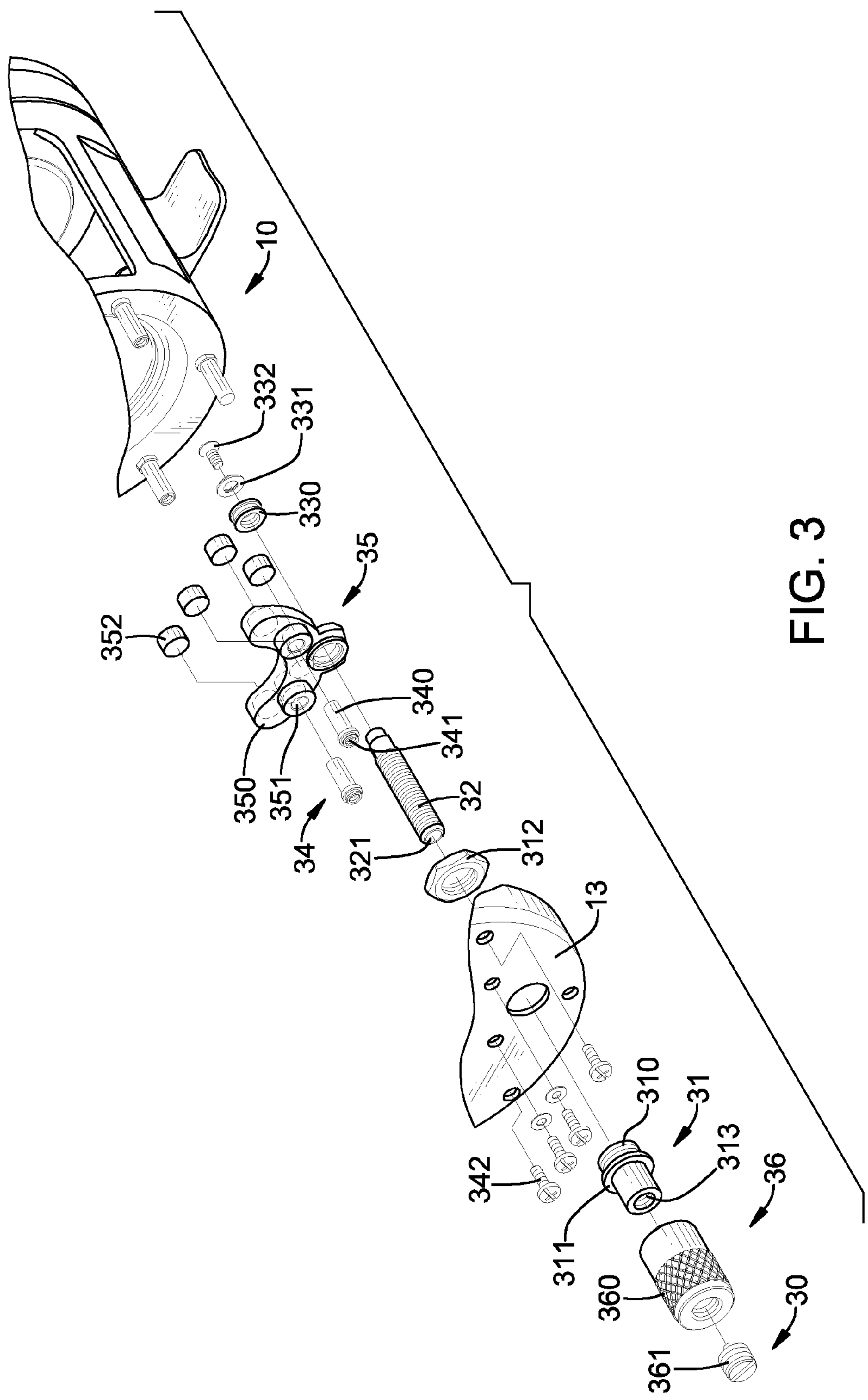
FIG. 3 is a partially exploded perspective view of a deceleration controller of the fishing reel in FIG. 2.
Figure 4:
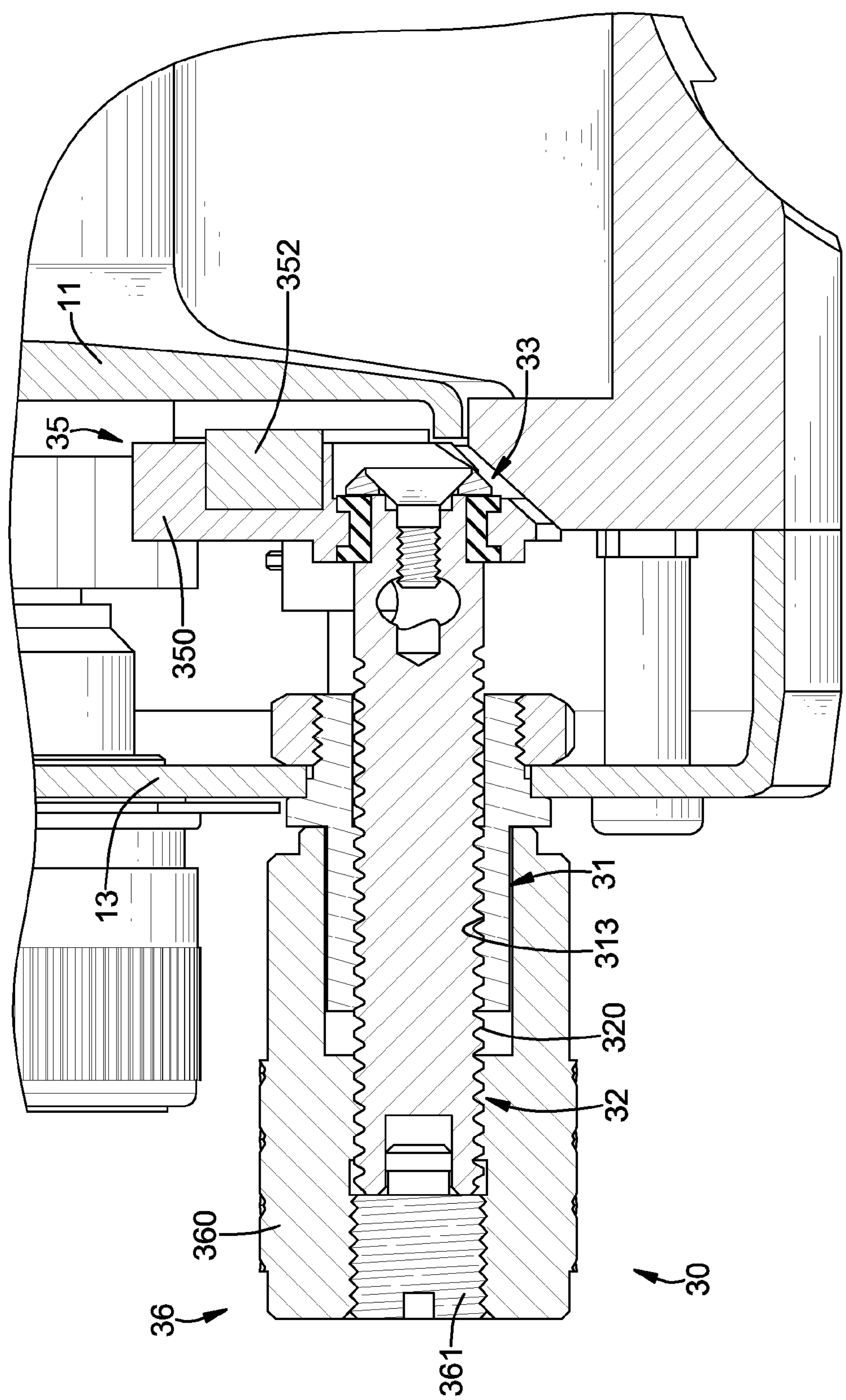
FIG. 4 is an enlarged side view in partial section of the deceleration controller of the fishing reel in accordance with the present invention.

With reference to FIGS. 3 and 4, the deceleration controller 30 is mounted on the side cover 13 and is moveable relative to the magnetic spool 11 to decelerate the rotation speed of the magnetic spool 11 finely by magnetism. The deceleration controller 30 has a mounting tube 31, a moving shaft 32, a connector 33, a guiding assembly 34, a magnetic assembly 35 and a switching button 36.

The mounting tube 31 is mounted through the side cover 13 and has a first section, a second section, an outer thread 310, a flange 311, a nut 312 and an inner thread 313. The first section of the mounting tube 31 protrudes toward the magnetic spool 11 and has an outer surface. The second section of the mounting tube 31 is opposite to the first section of the mounting tube 31 and has an inner surface. The outer thread 310 is formed on the outer surface of the first section of the mounting tube 31.

The flange 311 is formed around the mounting tube 31 between the first section and the second section and abuts on the outer side of the side cover 13. The nut 312 is screwed on the outer thread 310 to fasten and clip the mounting tube 31 on the side cover 13. The inner thread 313 is formed in the inner surface of the second section of the mounting tube 31.

The moving shaft 32 is movably mounted through the mounting tube 31 and has an inside end, an outside end, an outer surface, a thread section 320 and a recess 321. The inside end of the moving shaft 32 protrudes toward the magnetic spool 11, is located between the magnetic spool 11 and the side cover 13 and has an end face. The outside end of the moving shaft 32 is opposite to the magnetic spool 11, protrudes out the mounting tube 31 and has an end face. The thread section 320 is formed in the outer surface of the moving shaft 32 and is screwed with the inner thread 313 of the mounting tube 31. The recess 321 is formed in the end surface of the outside end of the moving shaft 32.

The connector 33 is mounted around the inside end of the moving shaft 32 and may have a ring 330, a washer 331 and a bolt 332. The ring 330 is mounted around the inside end of the moving shaft 32 and may be an elastic ring, such as a rubber ring. The washer 331 is mounted on the inside end of the moving shaft 32. The bolt 332 is screwed into the end surface of the inside end of the moving shaft 32 and is mounted through and abuts against the washer 331 to hold the ring 330 in position.

The guiding assembly 34 has two guiding bars 340 mounted through and attached to the side cover 13, protrude toward the magnetic spool 11 and is parallel to the moving shaft 32. Each guiding bar 340 has an outer surface, an abutting flange, a connecting end, a thread hole 341, a screw 342 and a guiding section.

The abutting flange is formed around the outer surface of the guiding bar 340 and abuts with the inner side of the side cover 13. The connecting end of the guiding bar 340 protrudes out the side cover 13. The thread hole 341 is formed in the connecting end of the guiding bar 340. The screw 342 is screwed into the thread hole 341 from the outer side of the side cover 13 and fixes and holds the guiding bar 340 on the side cover 13. The guiding section of the guiding bar 340 is located between the side cover 13 and the magnetic spool 11 and protrudes toward the magnetic spool 11.

The magnetic assembly 35 is mounted securely on the inside end of the moving shaft 32 and moveable inwardly or outwardly with the moving shaft 32 relative to the magnetic spool 11 and may have a base 350, two guiding holes 351 and multiple magnets 352. The base 350 is curved in shape, is mounted around the ring 330, is mounted on the inside end of the moving shaft 32 and is held and stopped by the washer 331 and the bolt 332 from escaping from the moving shaft 32. The guiding holes 351 are formed through the base 350 and are respectively mounted around the guiding bars 340. The magnets 352 are mounted on the base 350 and face the magnetic spool 11.

The switching button 36 is mounted securely on the outside end of the moving shaft 32 to turn the moving shaft 32 rotating relative to the mounting tube 31 and is moveable inwardly or outwardly relative to the magnetic spool 11 by the engagement between the thread section 320 of the moving shaft 32 and the inner thread 313 of the mounting tube 31.

The switching button 36 may have a switching tube 360 and a connecting bolt 361. The switching tube 360 has a through hole formed through the switching tube 360 and a thread segment defined in the through hole opposite to the side cover 13. The switching tube 360 is mounted on the outside end of the moving shaft 32 and rotatably mounted around the second section of the mounting tube 31. The connecting bolt 361 is threaded into the thread segment of the through hole of the switching tube 360 and has a protrusion protruding toward and into the recess 321 of the moving shaft 32 securely to connect the switching tube 360 and the moving shaft 32 together.

When throwing a bait, the switch is turned to make the clutch disengaging the magnetic spool 11 from the handle 12, and the magnetic spool 11 is rotatable freely, then the bait can be threw far away.

When the bait drops into water or falls on the ground of seal or river, the rotation controller 20 is operated to decelerate the rotation speed of the magnetic spool 11 roughly or the deceleration controller 30 is operated to decelerate the rotation speed of magnetic spool 11 finely.

Figure 5:
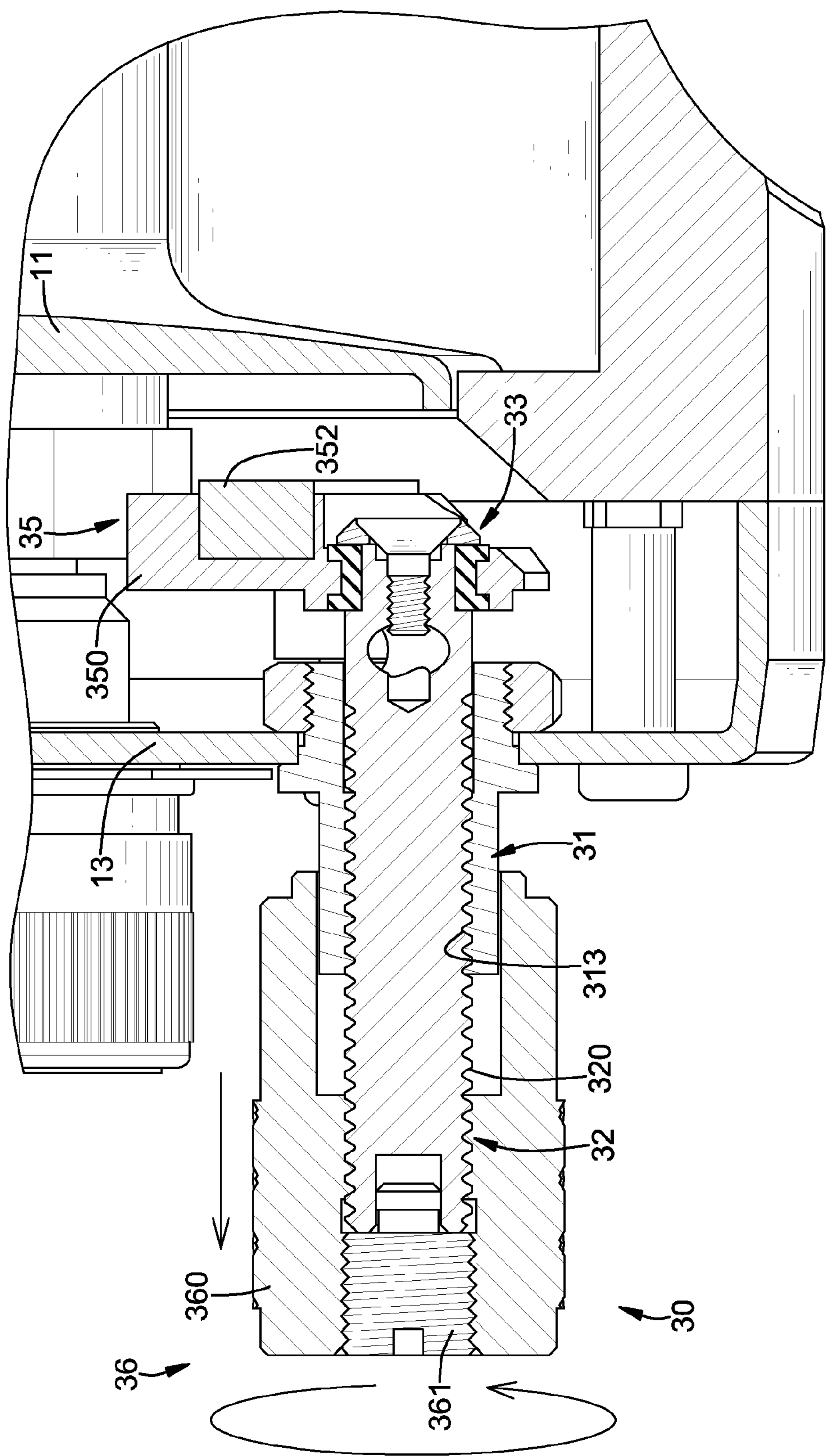
FIG. 5 is an operational enlarged side view in partial section of the fishing reel in FIG. 4 showing a using condition of the fishing reel.

With reference to FIGS. 2 and 5, in the operation of the deceleration controller 30, as the switching button 36 is turned, the magnetic assembly 35 on the moving shaft 32 is moved toward the magnetic spool 11. Because the thread section 320 of the moving shaft 32 is screwed with the inner thread 313 of the mounting tube 31, the moving shaft 32 is moved inwardly relative to the mounting tube 31 with the engagement between the thread section 320 and the inner thread 313.

Additionally, because the guiding bars 340 of the guiding assembly 34 are respectively inserted through the guiding holes 351 of the base 350, the base 350 of the magnetic assembly 35 is moved along the guiding bars 340 of the guiding assembly 34, and the magnetic assembly 35 is moved smoothly relative to the magnetic spool 11.

The magnetic assembly 35 mounted on the inside end of the moving shaft 32 is moved toward the magnetic spool 11 while the switching button 36 is rotating, and a magnetic force between the magnet 352 of the magnetic assembly 35 and the magnetic spool 11 is increased. The magnetic spool 11 is decelerated finely by the magnetic force. The switching button 360 also may be returned to decrease the magnetic force, and the magnetic force is changeable by turning or returning the switching button 36.

According to the description above, the magnetic assembly 35 is able to adjust inwardly or outwardly relative to the magnetic spool 11 and the magnetic force is changeable to control the rotation speed of the magnetic spool 11 and prevent the fishing line released too much and entwined.

Furthermore, because the deceleration controller 30 controls the rotation speed of the magnetic spool 11 by the magnetic force between the magnetic assembly 35 and the magnetic spool 11, the components of the deceleration controller 30 and the magnetic spool 11 has no contact and abrasion. The life span of the deceleration controller 30 can be efficiently prolonged, and the bait may be thrown out precisely, and the fishing line entwined problem may be solved.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A fishing reel comprising:
a body having
- a proximal end;
- a middle section;
- a magnetic spool rotatably mounted on the middle section of the body; and
- a side cover mounted on the proximal end of the body and having
  - an inner side facing the magnetic spool; and
  - an outer side being opposite to the magnetic spool;

a deceleration controller mounted on the side cover and having
- a mounting tube mounted through the side cover and having an inner thread;

a moving shaft movably mounted through the mounting tube and having an inside end protruding toward the magnetic spool and located between the magnetic spool and the side cover;

an outside end opposite to the magnetic spool and protruding out the mounting tube;

an outer surface; and a thread section formed in the outer surface of the moving shaft and screwed with the inner thread of the mounting tube;

a magnetic assembly mounted securely on the inside end of the moving shaft and moveable inwardly or outwardly with the moving shaft relative to the magnetic spool; and a switching button mounted securely on the outside end of the moving shaft to turn the moving shaft rotating relative to the mounting tube and moveable inwardly or outwardly relative to the magnetic spool.

2. The fishing reel as claimed in claim 1, wherein the magnetic assembly has a base and multiple magnets mounted on the base and facing the magnetic spool.

3. The fishing reel as claimed in claim 2, wherein the deceleration controller further has two guiding holes formed through the base; and two guiding bars mounted through and attached to the side cover, protruding toward the magnetic spool and being parallel to the moving shaft and mounted through the guiding holes.

4. The fishing reel as claimed in claim 3, wherein each guiding bar has an outer surface;

an abutting flange formed around the outer surface of the guiding bar and abutting with the inner side of the side cover;

a connecting end protruding out the side cover;

a thread hole formed in the connecting end of the guiding bar; and a screw screwed into the thread hole and fixing the guiding bar on the side cover.

5. The fishing reel as claimed in claim 4, wherein the mounting tube further has a first section protruding toward the magnetic spool and having an outer surface;

an outer thread formed on the outer surface of the first section;

a flange formed around the mounting tube and abutting on the outer side of the side cover; and a nut screwed on the outer thread to fasten the mounting tube on the side cover.

6. The fishing reel as claimed in claim 5, wherein the deceleration controller further has a connector mounted around the inside end of the moving shaft between the moving shaft and the magnetic assembly.

7. The fishing reel as claimed in claim 6, wherein the connector having a ring mounted around the inside end of the moving shaft between the moving shaft and the magnetic assembly;

a washer mounted on the inside end of the moving shaft; and a bolt screwed into the inside end of the moving shaft and mounted through and abutting against the washer to hold the ring in position.

8. The fishing reel as claimed in claim 7, wherein the switching button further has a switching tube mounted on the outside end of the moving shaft; and a connecting bolt threaded into the switching tube and connecting the switching tube and the moving shaft together.

9. The fishing reel as claimed in claim 8, wherein the moving shaft has a recess formed in the outside end of the moving shaft;

the switching tube has a through hole formed through the switching tube; and a thread segment defined in the through hole opposite to the side cover; and the connecting bolt is threaded into the thread segment of the switching tube and has a protrusion protruding toward and into the recess of the moving shaft securely.

10. The fishing reel as claimed in claim 9 further has a rotation controller mounted on the side cover and selectively presses on the magnetic spool to control the rotation speed of the magnetic spool.

11. The fishing reel as claimed in claim 1, wherein the mounting tube further has a first section protruding toward the magnetic spool and having an outer surface;

an outer thread formed on the outer surface of the first section;

a flange formed around the mounting tube and abutting on the outer side of the side cover; and a nut screwed on the outer thread to fasten the mounting tube on the side cover.

12. The fishing reel as claimed in claim 1, wherein the deceleration controller further has a connector mounted around the inside end of the moving shaft between the moving shaft and the magnetic assembly.

13. The fishing reel as claimed in claim 12, wherein the connector having a ring mounted around the inside end of the moving shaft between the moving shaft and the magnetic assembly;

a washer mounted on the inside end of the moving shaft; and a bolt screwed into the inside end of the moving shaft and mounted through and abutting against the washer to hold the ring in position.

14. The fishing reel as claimed in claim 1, wherein the switching button further has a switching tube mounted on the outside end of the moving shaft; and a connecting bolt threaded into the switching tube and connecting the switching tube and the moving shaft together.

15. The fishing reel as claimed in claim 14, wherein the moving shaft has a recess formed in the outside end of the moving shaft;

the switching tube has a through hole formed through the switching tube; and a thread segment defined in the through hole opposite to the side cover; and the connecting bolt is threaded into the thread segment of the switching tube and has a protrusion protruding toward and into the recess of the moving shaft securely.

16. The fishing reel as claimed in claim 1 further has a rotation controller mounted on the side cover and selectively presses on the magnetic spool to control the rotation speed of the magnetic spool.

* * * * *